Jan. 10, 1950

J. R. SABBIA 2,494,207

SINGLE ACTION SAFETY BELT DISCONNECT

Filed Aug. 4, 1948

INVENTOR.
Jerome R. Sabbia

BY
M. B. Tasker
ATTORNEY

INVENTOR.
Jerome R. Sabbia
BY
M. B. Tasker
ATTORNEY

INVENTOR.
Jerome R. Sabbia
BY
M. B. Tasker
ATTORNEY

Patented Jan. 10, 1950

2,494,207

UNITED STATES PATENT OFFICE 2,494,207

SINGLE-ACTION SAFETY BELT DISCONNECT

Jerome R. Sabbia, Bridgeport, Conn., assignor to United Aircraft Corporation, East Hartford, Conn., a corporation of Delaware Application August 4, 1948, Serial No. 42,442

9 Claims. (Cl. 244—122)

This invention relates to high speed aircraft and particularly to improvements in mechanisms for releasing a pilot and his personal equipment from an ejectable type seat after the seat is free of the aircraft.

More specifically, this invention relates to an improved mechanism for freeing the pilot and disconnecting his supply lines for air, oxygen and electrical services by a single acting unit during normal egress from the cockpit or during emergency exit after the seat has been ejected from the airplane.

In aircraft which are adapted to flying at high speeds and at extreme altitudes such as fighter planes and the like, the pilot wears a G-suit which must be supplied to a flexible connection with air under pressure from a suitable source in the airplane. Similarly, oxygen must also be supplied through another flexible connection to the pilot's mask and various electrical connections must be established to the heating coils in the electrically heated pilot's suit, to his microphone and to his headset.

In an airplane having an ejectable type pilot's seat which is forcibly projected clear of the airplane to facilitate emergency exit, it is vitally necessary that a means be provided to instantaneously release the pilot's personal equipment from the supply sources in the aircraft. It is also necessary to include a quick disconnecting mechanism that will enable the pilot by a singe movement to release and extricate himself and also release his personal equipment from the ejected seat when the proper position in the trajectory of the latter has been reached. Further it is necessary that this single acting unit consist of an easily operated, simple and rugged mechanism capable of withstanding the hard usage of repeated ordinary exits from the aircraft.

It is therefore an object of this invention to provide a quick disconnect mechanism which releases the pilot and his personal flight equipment from an ejectable seat once the seat has reached the top of its trajectory free of the airplane.

Another object of this invention is to provide a simple, rugged mechanism, as stated above, which can withstand the normal continuous hard usage resulting from frequent ordinary exits from the aircraft.

A further object of this invention is to provide a mechanism in combination with an ejectable seat wherein the pilot's fluid and electrical supplying lines are disconnected from the aircraft supply sources upon initial movements of the seat during ejection and wherein the pilot simultaneously disconnects his personal supply lines and releases himself from the seat at the top of the latter's trajectory.

These and other objects will become apparent from the following detail description of the accompanying drawings which illustrate only one embodiment of this invention.

Figure 1:
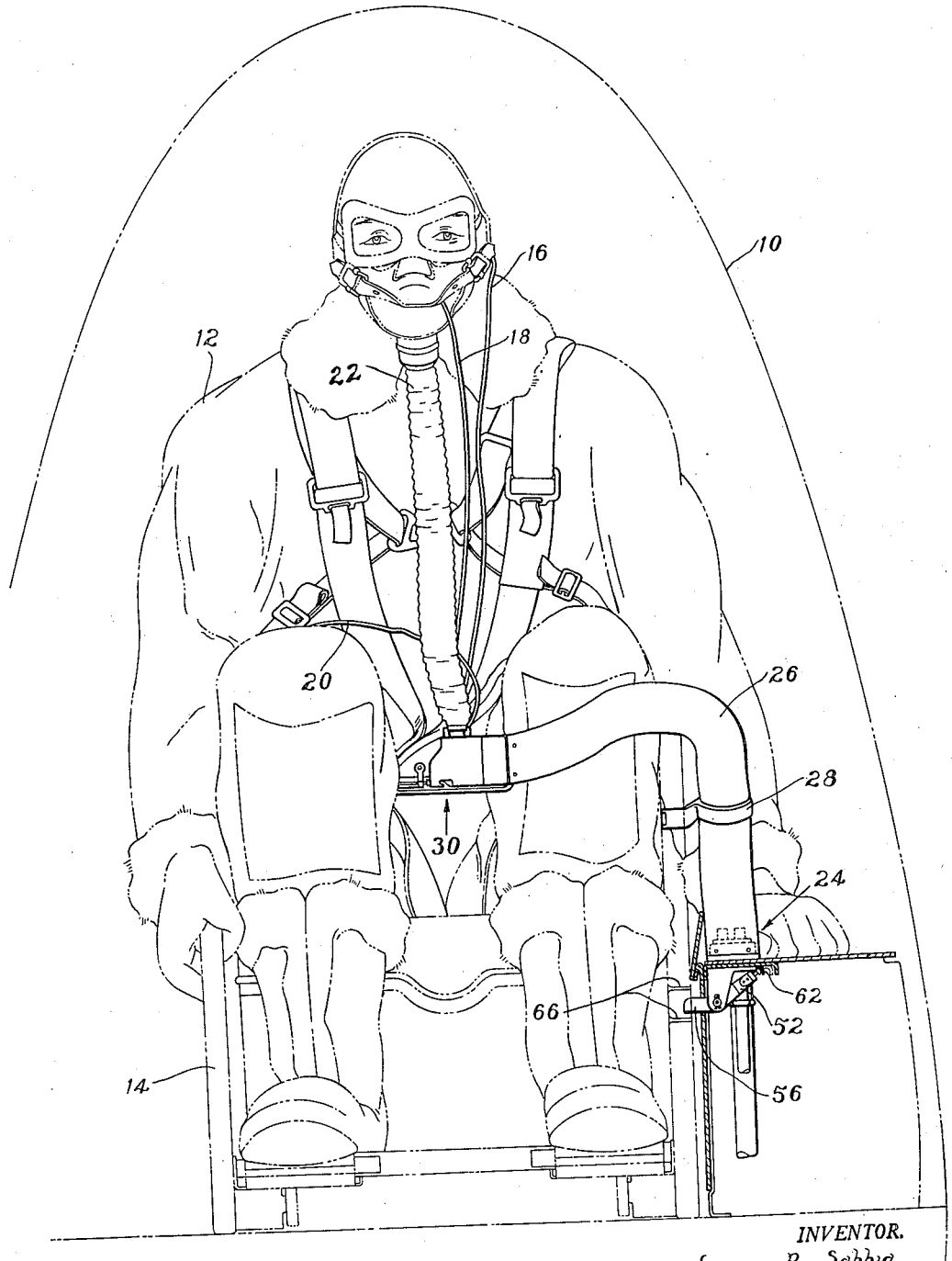
Fig. 1 is a front elevation of the cockpit section of an aircraft indicating the position of the pilot and the mechanism of this invention utilized with an ejectable type seat.

Referring now to Fig. 1, the numeral 10 indicates the cockpit enclosure of an airplane with a pilot 12 positioned within an ejectable type seat 14. The equipment normally carried by the pilot consists of the electrical supply lines 16 for his headset, 18 for his microphone and 20 for his heated flying suit, in addition to a flexible oxygen supply line 22 and an air pressure line (not shown) for his G-suit. These various supply services are releasably connected to sources in the aircraft through a quick disconnect console 24 which ordinarily releases the flexible supply line conduit 26 from the aircraft structure during initial movements of the seat during ejection of the latter from the airplane in a manner to be described hereinafter. The flexible conduit 26 is fixed to the seat 14 by a clamp 28 and leads to the single action disconnect mechanism 30 of this invention.

Figure 2:
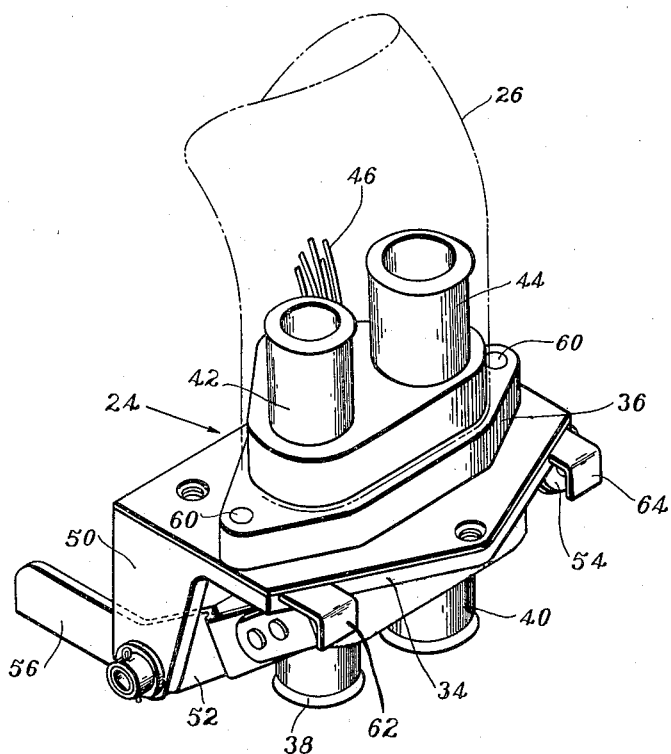
Fig. 2 is a perspective view of the disconnect console which releasably connects the pilot's supply lines to the aircraft structure.

Referring now to Fig. 2 the quick disconnect console 24 shown herein is identical to the improved quick disconnect which is fully described and claimed in patent application Serial No. 26,902 filed May 13, 1948, now Patent No. 2,482,292, issued September 20, 1949. The console 24 primarily consists of a base 34 to which is releasably mounted a tiered pedestal 36, the former including fluid fittings 38, 40 and an electrical fitting (not shown) which are connected to the supply sources in the aircraft and the latter including fluid fittings 42, 44 and electrical leads 46 which connect to the pilot's personal equipment via the flexible conduit 26 and the single action disconnect 30 (Fig. 1). The base 34 of the quick disconnect console carries a pair of downwardly disposed legs 50 (only one of which is visible) which have pivotally attached thereto a pair of parallel arms 52 and 54, the arm 52 including a rearwardly disposed actuating lever 56. A pair of locking pins 60 fixed to the pedestal 36 normally lock the pedestal to the base 34 by engaging slots (not shown) within the locking elements 62 and 64 which are slidably mounted within the base 34. The slots within the locking elements 62 and 64 are such that when these locking elements are moved outwardly they disengage the pins 60 thereby releasing the pedestal 36 from the base 34. Referring then to Fig. 1, it will be apparent that when the seat 14 begins its initial movements during ejection from the cockpit, the flanges 66 which are fixed to the seat 14 will engage the actuating lever 56 so that the lever and consequently the arm 52 will be rotated clockwise thereby forcing the locking element 62 from the full to the dotted line position. As previously mentioned in connection with Fig. 2 outward movement of the locking element 62 and its corresponding element 64 will disengage these elements from the pins 60 to release the pedestal 36 from the base 34.

Figure 4:
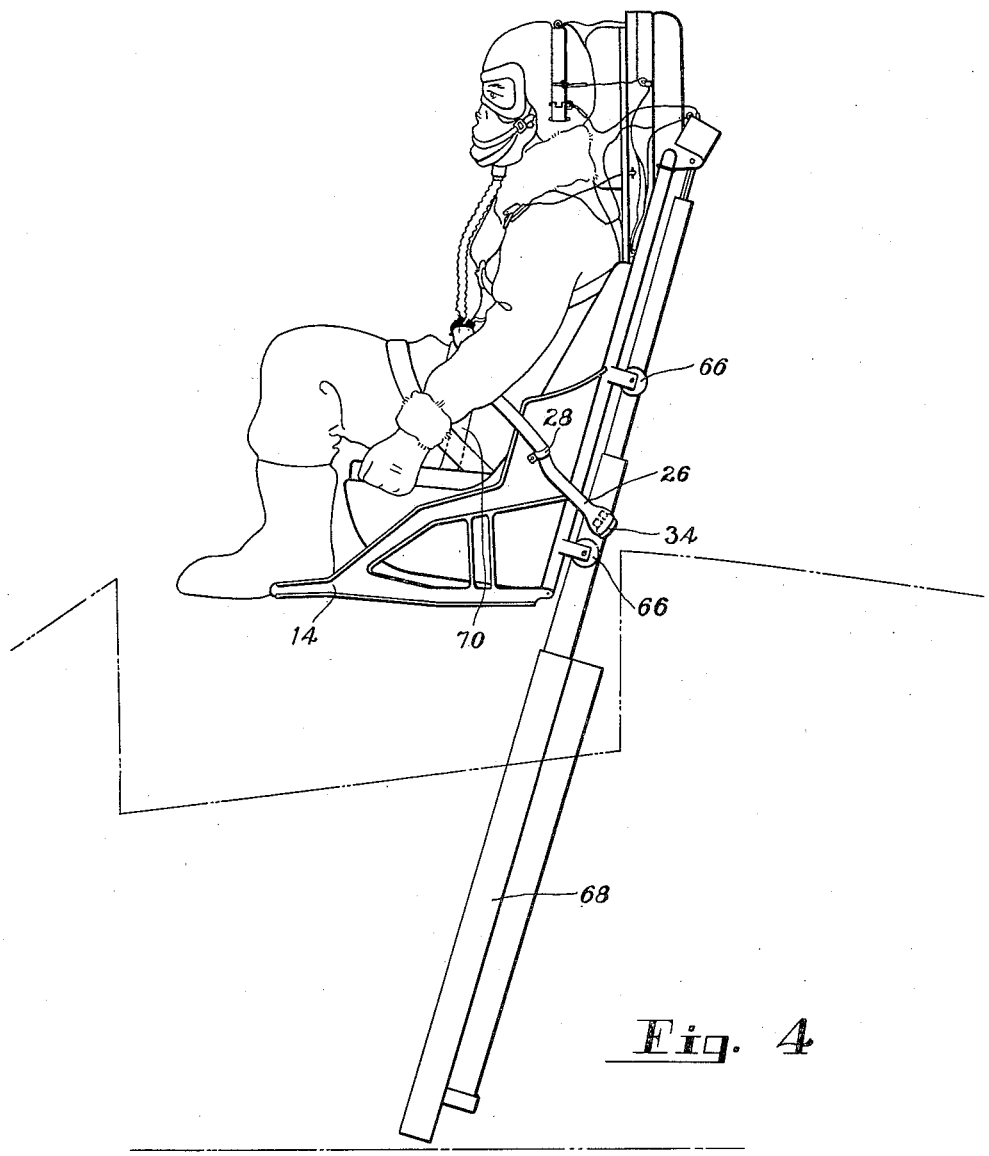
Fig. 4 is a side elevation indicating the position of the pilot and the ejectable seat as the latter is leaving the cockpit of an airplane at the beginning of its trajectory.

As the seat 14 moves further out of the cockpit it reaches the position shown in Fig. 4 wherein the rollers 66 have left the track 68. It should be noted that the pilot is still fastened to the seat by the safety belt 70 while the flexible conduit 26 leading to the pilot's personal equipment is still fixed to the seat by the clamp 28; the pedestal 34 of the quick disconnect console 24 now being free of the aircraft structure.

The method by which the seat can be ejected from the aircraft may be of the explosive shell type, or other means known in the art.

Figure 3:
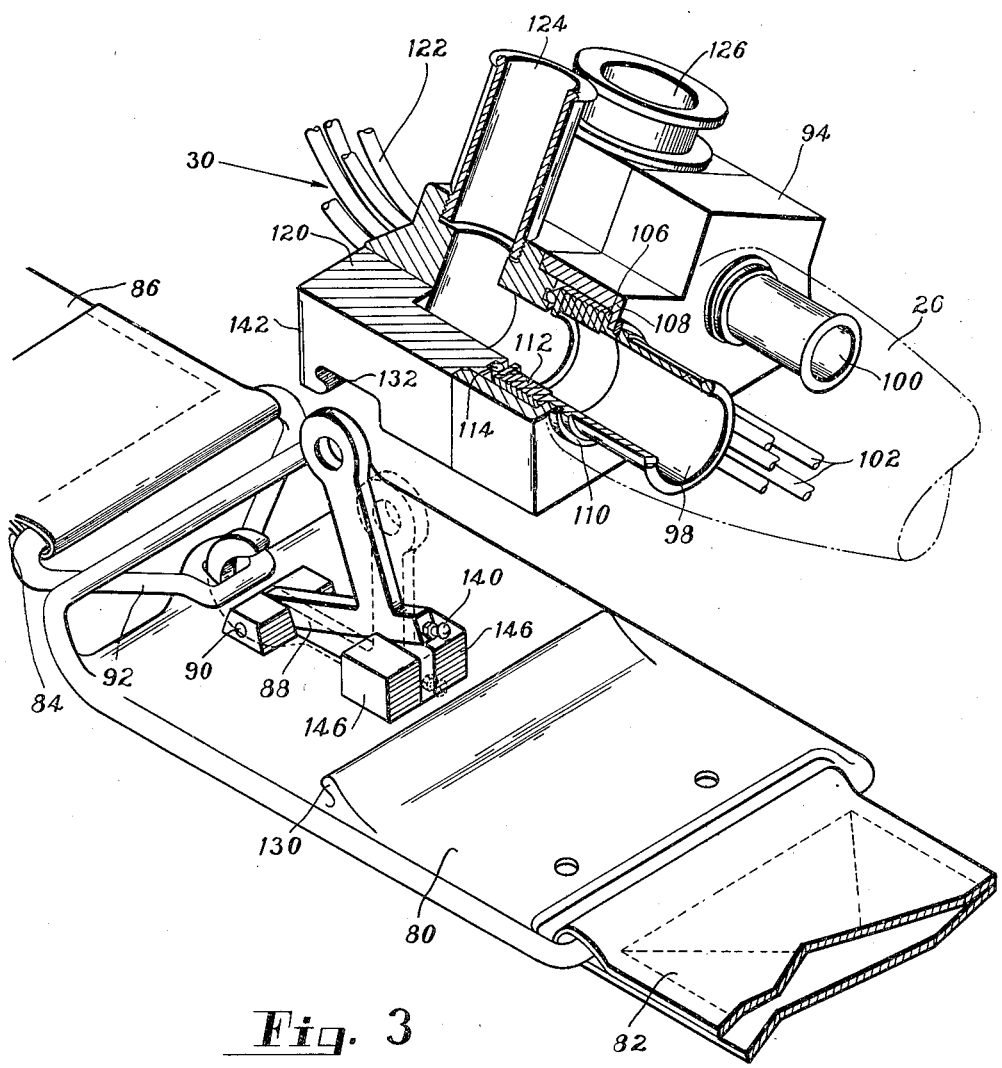
Fig. 3 is a detail perspective view of the pilot's quick disconnect mechanism in partial section, the mechanism shown being capable of releasing the pilot and his personal equipment from the seat.

It now becomes obvious that as the seat 14 begins to slow down upon reaching the top of its trajectory, it is necessary for the pilot to extricate himself by releasing the safety belt and the flexible conduit 26 which connect him and his equipment, respectively, to the seat. To this end, a single action release mechanism 30 is provided as shown in Fig. 3. The mechanism 30 consists of a safety belt buckle of the type well known in the art and includes a main base 80 having attached thereto one free end 82 of the safety belt 70 and a cooperating attachment 84 fixed to the other free end 86 of the safety belt 70. A hook type latch member 88 is pivotally mounted at 90 to the base 80 for engaging and disengaging the cross bar 92 on the belt attachment 84. An adapter 94 is fixed to the base 80 by means of screws 96 and forms one portion of the supply line disconnect mechanism for releasing the pilot carried equipment from the flexible conduit 26 which is fastened to the seat. The adapter 94 contains a plurality of passages therein in which are fixed fluid fittings 98, 100 and an electrical connector 102. The passage 98 which is similar to the passage 100 has at its adapter engaging end a flange 106 which abuts a cooperating flange 108 on the adapter, a lock ring 110 being provided on the outside of the adapter 94 to securely fasten the fitting 98 to the adapter. A bellows 112 is positioned within the passage in the adapter 94 and has one end abutting the flange 106 on the fitting 98 and its other end abutting a seal 114 which is seated within the pilot carried movable member 120 thereby forming a fluid tight seal therebetween. The movable member 120 contains right angled passages therein which cooperate with corresponding passages within the adapter 94, the passages in the movable member 120 having the electrical connections 122 and the fluid connectors 124 and 126 attached thereto for communication with the various pilot's supply lines. The bellows 112 in the adapter 94 is normally equal in length to the depth of the passage in the adapter 94 so that it will be compressed as the cooperating passage in the movable member 120 is engaged therewith.

In order to lock the movable member 120 to the relatively fixed adapter 94, the base 80 on the safety belt carries a tongue 130 which engages a complementary groove 132 on the lower portion of the movable member 120. When the tongue 130 engages the groove 132 so that the various cooperating passages of the member 120 and the adapter 94 are in intimate contact they can be locked in this position by moving the latch 88 from the full to the dotted line position shown in Fig. 3 so that the adjustable cam element 140 will engage the striker plate 142 on the side face of the movable member 120 to further force the tongue 130 to a positive locking engagement with the groove 132. The relatively free end of the latch 88 fits between friction type locking blocks 146 which prevent the latch from being inadvertently moved to an unlocked position. A spring loaded ball fitting may be used to lock the latch in position in place of using a friction type lock.

Thus it is apparent that in one movement of the latch member 88 the free ends 82 and 86 of the safety belt 70 can be freed from each other while at the same time the movable member 120 can be easily disengaged from the adapter 94. In operation then, during emergency exit the pilot will release the canopy and fire the seat ejection propellant charge. The initial movements of the seat as seen in Fig. 1 will cause the flanges 66 to engage and rotate the actuating lever 56 and the arm 52 thereby forcing the locking element 62 from the full to the dotted line position to automatically disengage the flexible conduit and its integral pedestal (Fig. 2) from the base 34 which is rigidly attached to the aircraft structure. The seat 14 and the pilot who is still fastened to the seat by the safety belt 70 will leave the aircraft as seen in Fig. 4. At the same time the pilot's personal equipment is still fastened to the seat by reason of the flexible conduit 26 being connected thereby by the clamp 28. At the top of the trajectory when the pilot's parachute is about to open either automatically or manually he can raise the latch member 88 (seen in Fig. 3) from the dotted to the full line position thereby disengaging the hook from the cross bar 92 to disconnect the safety belt while at the same time the cam element 140 will become disengaged from the striker plates 42 on the movable member 120 so that the latter is easily freed from the adapter 94 which is carried by the one free end of the safety belt.

Thus it can be seen that both in emergency and in normal exit the pilot can release himself and his personal equipment from the airplane and seat with a minimum of effort.

As a result of this invention it is evident that a simple, rugged single acting disconnect mechanism has been provided to release the safety belt and supply line connections of a pilot from the seat of an airplane.

Further as a result of this invention a sturdy single action releasing unit has been provided which is capable of repeated hard usage during frequent normal exit from the aircraft.

Although only one embodiment has been described and shown herein it is obvious and evident that numerous changes and modifications of the structure of the various elements and the arrangements of the parts can be made without materially departing from the scope of this novel concept.

What it is desired by Letters Patent is:

1. In an aircraft, an ejectable seat, means for releasably securing an occupant to said seat, a supply source in the aircraft, supply lines carried by said occupant having a communicable connection releasably mounted on said securing means, a cooperating member communicably connecting said supply source to the connection on said securing means including fittings at said supply source and at said connection, means for automatically releasing said member from said source during initial movements during the ejection of said seat, and means for simultaneously disconnecting said member from said connection upon release of said occupant securing means.

2. In an aircraft, an ejectable seat, means for releasably securing an occupant to said seat, a supply source in the aircraft, a member attached to said seat having a communicable connection to said source, supply lines carried by said occupant and communicably attached to said member, means for releasing said member from said source upon initial movements of said seat upon ejection from the aircraft, and means for releasing said supply lines from said member automatically in response to release of said occupant securing means.

3. In an aircraft having an ejectable pilot's seat, releasable means carried by the seat for fastening the pilot to the seat, equipment adapted to be operatively worn by a pilot while in said seat, means including fluid and electrical supply lines connecting said equipment with sources of supply carried by the airplane, releasable fittings located on said supply lines and attached to the airplane and to said seat, means responsive to ejection of said seat from the airplane for disconnecting the fitting on the airplane, and means responsive to release of said pilot fastening means for disconnecting said fitting on the seat.

4. In an aircraft, an ejectable pilot's seat having releasable pilot securing means mounted thereon, equipment carried by the pilot, means for releasably and operatively connecting the pilot's equipment to the seat and also to a fixed part of the aircraft structure, mechanism operated by the initial movement of the seat as it leaves the aircraft during ejection for disconnecting said releasable connection to the aircraft structure, and mechanism operated in response to release of said pilot securing means for disconnecting said releasable connection to the seat.

5. In an aircraft, a pilot's compartment, an ejectable pilot's seat adapted to be projected from said compartment, means for releasably securing a pilot in said seat, equipment adapted to be worn by a pilot in said seat, means including fluid and electrical supply lines connecting said equipment with sources of supply carried by the aircraft including flexible members, two releasable disconnecting means in said supply lines each including fittings, mechanism carried by the aircraft adjacent one of said disconnecting means including a member operative in response to the initial movement of said seat as the latter is projected from the compartment for positively disconnecting the fittings of said mechanism, and release mechanism carried by said pilot securing means adjacent the second of said disconnecting means including elements operated upon release of said pilot securing means for disconnecting the fittings of said release mechanism.

6. In a combination pilot's safety belt and supply line quick disconnect mechanism for an aircraft, a safety belt having two ends adapted to be releasably connected together, supply lines attached to the airplane, an adapter attached to one of said safety belt ends and having passages therein communicable with said supply lines, a member carried by the pilot and having passages therein capable of fluid tight alignment with the passages in said adapter, and single acting means for releasably locking said member to said adapter and releasably connecting the ends of said belt.

7. In a mechanism for releasably securing a pilot to an ejectable seat, said seat being adapted to be projected from an airplane, a safety belt connected to said seat and having two free ends, latch mechanism operable by the pilot for releasably connecting the free ends of said safety belt, an adapter carried by one of said free ends having passages therein, fittings connected within said passages for conducting fluid therethrough, supply lines carried by the pilot including a movable member, said member having passages therein and being adapted to be releasably connected to said adapter for providing a fluid tight seal between the passages in said adapter and said member, and cam means responsive to operation of said latch mechanism including a cam element operatively connected to said latch mechanism for releasably locking said member to said adapter.

8. In a safety belt quick disconnect adapted to releasably fasten a pilot and pilot's equipment to a seat, said equipment including the fluid and electrical supply lines, a safety belt attached to the seat having two free ends, latch mechanism for connecting one of said ends to the other of said ends, an adapter carried by one of said safety belt ends having fluid and electrical connections therein, a member carried by the pilot adapted to connect said supply lines to the fluid and electrical connections in said adapter, cooperating detent means on one end of said belt and on said member, and means for releasably locking said detent means in response to operation of said latch mechanism.

9. In a mechanism for releasably securing a pilot and for operatively releasably securing pilot carried equipment to an ejectable aircraft seat, a safety belt having two ends, a latch member attached to one of said ends, a movable latch element attached to the other of said ends for releasably engaging said latch member, a source of supply for operating said pilot's equipment, an adapter fixed to the other of said belt ends and operatively connected to said source including a bellows, a movable member operatively connected to said equipment and adapted to engage said bellows and adapter to form a fluid tight seal therebetween, cooperating detent means on said movable member and on the other of said belt ends for holding said adapter and movable member in engaging position, and means for releasably locking said adapter and member in the engaged position in response to engagement of said latch with said latch element.

JEROME R. SABBIA.

(References on following page)

REFERENCES CITED

The following references are of record in the file of this patent:

UNITED STATES PATENTS

| Number | Name | Date |
|---|---|---|
| 2,210,449 | Fleet et al. | Aug. 6, 1940 |
| 2,331,309 | Curriston | Oct. 12, 1943 |
| 2,467,763 | Martin | Apr. 19, 1949 |

FOREIGN PATENTS

| Number | Country | Date |
|---|---|---|
| 501,203 | Great Britain | Feb. 20, 1939 |
| 501,236 | Great Britain | Feb. 20, 1939 |